United States Patent [19]
Botros et al.

[11] Patent Number: 6,146,092
[45] Date of Patent: Nov. 14, 2000

[54] CENTRIFUGAL BLOWER ASSEMBLY WITH A DIFFUSER

[75] Inventors: Monier Bibawy Botros, Troy; Dennis Anthony Vermette, Westland, both of Mich.

[73] Assignee: Ford Motor Company, Dearborn, Mich.

[21] Appl. No.: 09/113,021

[22] Filed: Jul. 13, 1998

[51] Int. Cl.[7] .............................. F04D 29/44; F04D 29/68
[52] U.S. Cl. ........................ 415/119; 415/176; 415/178; 415/200; 415/204; 415/206; 415/207; 415/211.1; 415/914
[58] Field of Search ..................... 415/119, 176, 415/178, 200, 204, 206, 207, 211.1, 914; 165/135; 454/906

[56] References Cited

U.S. PATENT DOCUMENTS

| | | |
|---|---|---|
| 3,157,776 | 11/1964 | Sohn et al. . |
| 3,251,540 | 5/1966 | Kinsworthy . |
| 3,365,122 | 1/1968 | Hajec et al. .............................. 415/204 |
| 3,407,993 | 10/1968 | Bostrom .................................. 415/200 |
| 4,494,908 | 1/1985 | Hopfensperger . |
| 4,821,792 | 4/1989 | Bednarek . |
| 4,836,743 | 6/1989 | Gue ou et al. . |
| 4,958,504 | 9/1990 | Ichikawa et al. . |
| 4,991,646 | 2/1991 | Spears . |
| 5,086,830 | 2/1992 | Heinle et al. . |
| 5,228,831 | 7/1993 | Becker ..................................... 415/206 |
| 5,286,162 | 2/1994 | Veres ....................................... 415/206 |
| 5,733,320 | 3/1998 | Augustine ................................ 454/906 |

FOREIGN PATENT DOCUMENTS

| | | |
|---|---|---|
| 1475284 | 2/1967 | France . |
| 2707860 | 8/1978 | Germany ................................. 415/204 |
| 59-131799 | 7/1984 | Japan . |
| 60-145497 | 7/1985 | Japan . |
| 5-195995 | 8/1993 | Japan . |
| 1071815 | 2/1984 | U.S.S.R. . |
| 1687894 | 10/1991 | U.S.S.R. . |

*Primary Examiner*—Christopher Verdier
*Attorney, Agent, or Firm*—Raymond L. Coppiellie

[57] ABSTRACT

A centrifugal blower assembly for a heat exchanger system of an automotive vehicle is described. The centrifugal blower assembly includes a diffuser section interposed between the centrifugal blower housing and a heat exchanger housing in the heat exchanger system. The diffuser section has a pair of non-linear, curved side walls which allow for expansion of the air flowing therethrough to minimize air flow separation against the side walls of the diffuser.

10 Claims, 3 Drawing Sheets

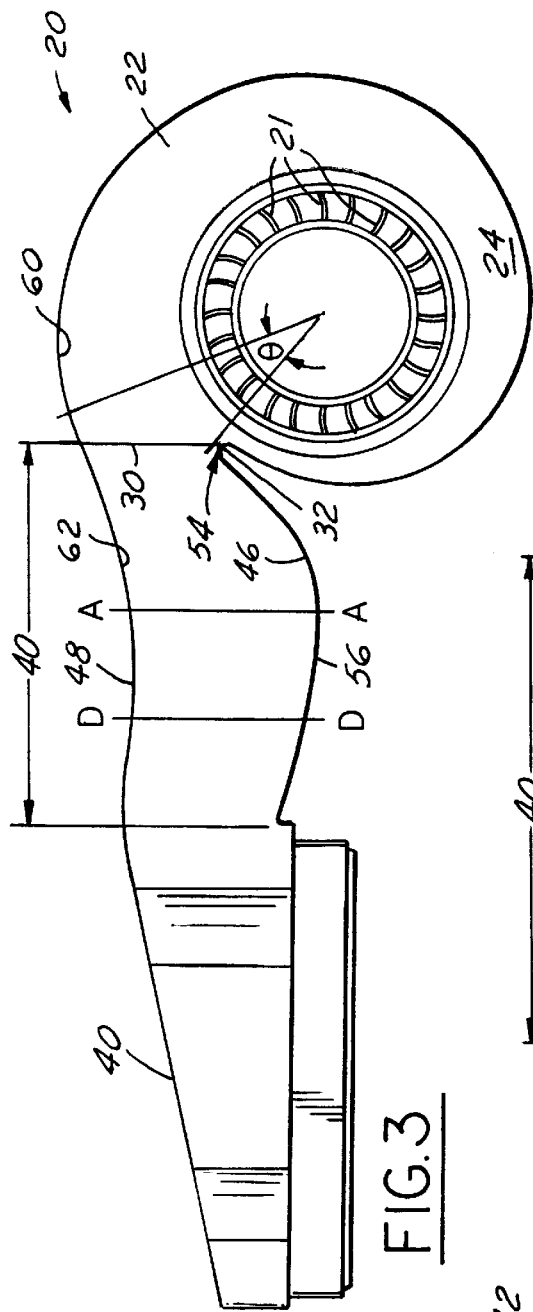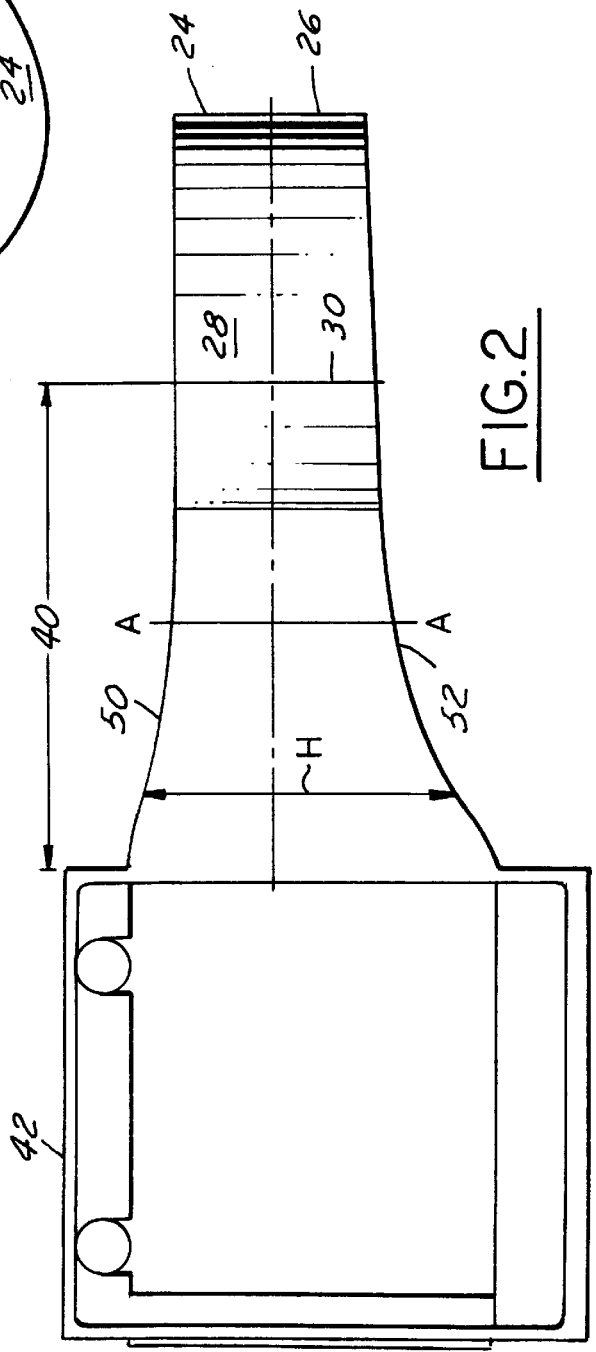

CENTRIFUGAL BLOWER ASSEMBLY WITH A DIFFUSER

BACKGROUND OF THE INVENTION

1. Field of the Invention

This invention relates to a centrifugal blower assembly for an automotive vehicle. More particularly, the present invention relates to a centrifugal blower assembly used in a heat exchange system of an automotive vehicle and wherein the centrifugal blower includes a diffuser at its exit end.

2. Disclosure Information

In automotive heating and air conditioning systems, the air flowing through a heat exchanger core is generated by a centrifugal blower upstream of the core and connected to it by a passage or plenum. The radial flow squirrel cage type of blower, such as a centrifugal fan, is commonly used because it is efficient and compact. The blower is contained within a scroll-shaped, volute housing which ends at an exit end and is connected to the heat exchanger by a straight or angled housing. FIG. 1 shows a typical prior art centrifugal blower assembly having a housing 10 with a passage connected to a heat exchanger. The passage 12 of the FIG. 1 embodiment shows straight walls.

In known fashion, the blower wheel pulls air into the blower housing 10. The amount of air moved by the blower increases as a point on the wheel moves within the housing from an edge of the inlet opening of the housing. The housing is positioned progressively further from the wheel in the direction of rotation to accommodate the growing volume of air, that being due to the volute shape of the housing. The blower action produces a stream of high velocity air (shown by arrows) which is ejected from the exit end of the housing. The high velocity stream tends to stay together hugging the walls of the passage adjacent the edges. As the air continues to impact upon the side wall edges of the passage way, air separation occurs at 14, 16. This separation is reversed several times down the length of the passage way and results in noise and decreased efficiency of the centrifugal blower.

It is desirable that the air velocity through the passage from the blower housing to the heat exchanger be uniform and that separation of the air flow be prevented to reduce the noise produced by the blower as well as increase the efficiency of the blower. U.S. Pat. No. 4,991,646 discloses one method of minimizing airflow separation by providing a plurality of baffles within the passage to break up the high velocity stream of air along the wall sides of the passage way. Other such devices have been proposed such as grids connected to the exit end of the centrifugal blower housing.

While the disclosed proposals may function as intended, their efficiency is questionable when package space is somewhat smaller due to the ever increasing compactness of engine compartments. Therefore, it would be desirable to provide a compact centrifugal blower assembly which minimizes airflow separation between the blower and a heat exchanger downstream and which reduces or eliminates noise.

It is an object of the present invention to provide a centrifugal blower assembly for use in a heat exchange system which uses a non-linear, non-planar shaped diffuser disposed between the centrifugal blower housing and the heat exchanger which minimizes airflow separation therebetween.

SUMMARY OF THE INVENTION

The present invention overcomes the disadvantages of the prior art by providing a heat exchange system for an automotive vehicle comprising a heat exchanger disposed in a casing and a centrifugal blower disposed upstream from the heat exchanger core for producing a flow of directed to the heat exchanger core. The centrifugal blower is disposed in a generally scroll-shaped housing including an air inlet side, a bottom side opposite the air inlet side and a generally cylindrical, curved wall extending between the air inlet side and the bottom side. These sides define a volute chamber through which a volume of air passes, the chamber terminating in an exit end including a cut-off edge section. The blower assembly also includes a diffuser extending between the exit end of blower housing and the casing. The diffuser includes a top wall, a bottom wall, a first side and a second side which define a chamber. The chamber has a height generally perpendicular to its transverse diameter together which define a volume. The first side of the diffuser includes a generally convex-shaped portion proximate the blower cut-off and a generally concave-shaped bulged section disposed a predetermined distance from the convex-shaped portion. The second side of the diffuser includes a generally concave-shaped portion proximate the cut-off edge side wall and a generally convex-shaped portion spaced a predetermined distance from the concave-shaped portion. In the present invention, the centrifugal blower produces a stream of non-uniform air flow through the blower housing toward the casing and the diffuser minimizes separation of the air flow to the casing and substantially eliminates the impact of the air flowing in a non-linear motion to reduce noise.

It is an advantage of the present invention that airflow separation and noise are reduced in an efficient and compact package. These and other features and advantages of the present invention will become apparent from the drawings, detailed description and claims which follow.

BRIEF DESCRIPTION OF THE DRAWINGS

FIG. 2 shows a top plan view of a centrifugal blower assembly structured in accord with the principles of the present invention.

FIG. 3 shows a side elevational view of a centrifugal blower assembly structured in accord with the principles of the present invention.

DETAILED DESCRIPTION OF THE PREFERRED EMBODIMENTS

Figure 1:
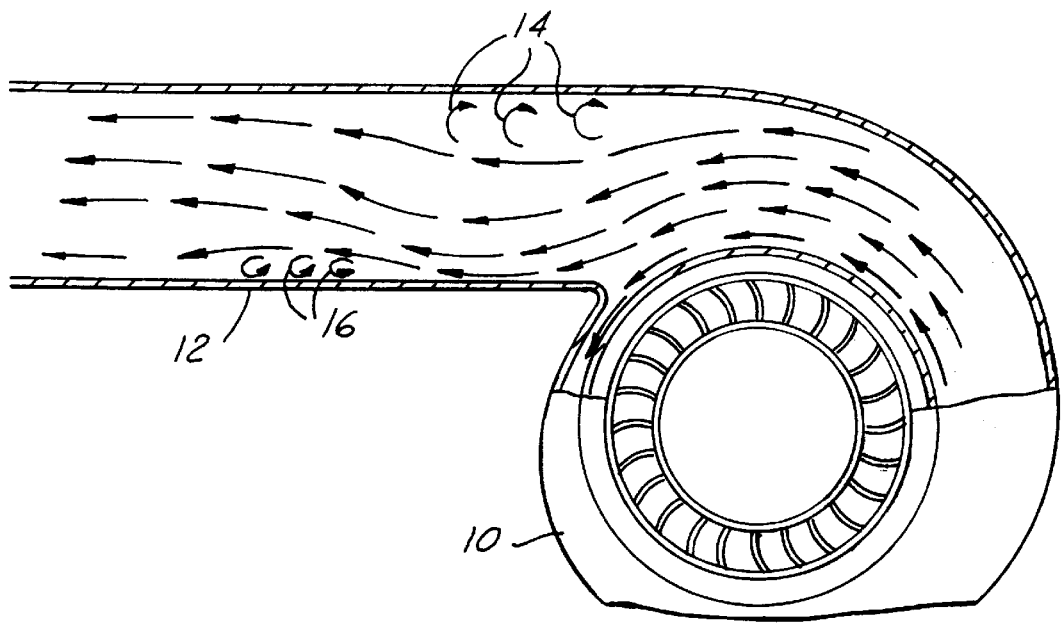
FIG. 1 is a schematic representation of airflow moving through a typical centrifugal blower assembly known in the prior art.

Referring now to the drawings, FIGS. 2 and 3 show a centrifugal blower/fan assembly 20 according to the present invention for use in a heat exchange system of an automotive vehicle. The centrifugal blower assembly 20 includes a fan wheel having a plurality of fan blades 21 disposed around a fan inlet ring and a hub as is known in the art. The fan wheel is disposed within a housing 22 typically manufactured from two generally symmetrical halves 24, 26 which are joined and secured together at a weld seam. The housing 22 includes an inlet side 24 and a bottom side 26 opposite the inlet side for receiving the electrical motor for driving the centrifugal fan. The housing 22 further includes a generally cylindrical curved wall 28 disposed between the inlet side 24 and the bottom side 26 of the housing, the generally cylindrical curved wall 28 being in a shape of a volute. The volume defined by the inlet and bottom sides as well as the curved wall 23 grows into an ever increasing volume of the housing.

The housing 22 is scroll-shaped and includes exit end 30 which includes a cut-off edge 32 disposed at the exit passage for air leaving the housing. As will be described in greater detail below, a diffuser 40 is interposed between the exit end 30 of the housing 22 and a casing 42 for holding a heat exchanger or other type of device used in the exchange or ventilation system of the vehicle. As can readily be seen in FIG. 3, the diffuser 40 includes a pair of non-linear side walls 46, 48 which minimize air flow separation therealong as will be described.

Figure 4:
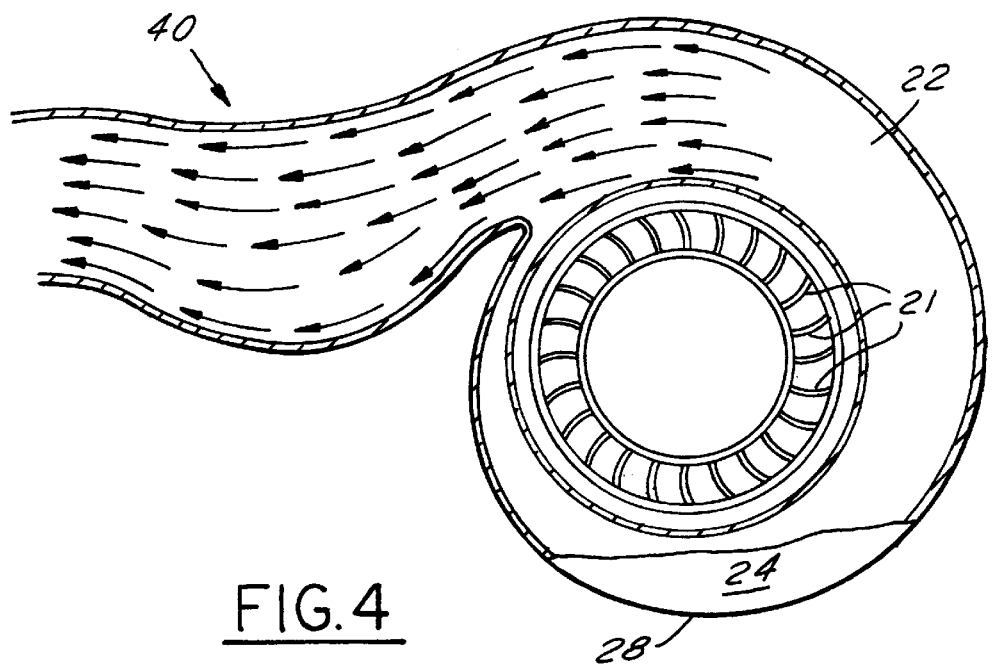
FIG. 4 shows a schematic representation of the airflow through a centrifugal blower assembly structured in accord with the principles of the present invention.

FIG. 4 shows the effect that the non-linear side walls 46, 48 of the diffuser 40 of the present invention provide. FIG. 4 is a velocity vector diagram of the present invention which shows that the airflow in the diffuser 40 does not directly impact the side walls 46 as it leaves the housing and therefore does not separate. The diffuser 40 is structured so that the air flowing through it expands gradually to convert the kinetic energy of the air into a static pressure (potential energy). The width of the diffuser 40 decreases as the air is moved closer to the heat exchanger but the height of the diffuser (as seen in FIG. 3) increases at a higher rate to match the height of the heat exchanger casing 42 or cabin filtration element. This allows for greater expansion of the air entering the heat exchanger, thus preventing the airflow separation.

Details of the diffuser 40 will now be described with reference again to FIGS. 2 and 3. The diffuser 40 extends between the exit end 30 of the blower housing 22 and the heat exchanger casing 42. The diffuser includes a top wall 50 and a bottom wall 52. The first side 46 of the diffuser includes a generally convex-shaped portion 54 which is immediately adjacent the cut-off edge 32 of the blower housing 22. The shape of the convex-shaped portion 54 of the first side 46 is predetermined as a function of the expansion index of the scroll housing. Those skilled in the art will appreciate that every scroll volute housing has a specific expansion index. The convex-shaped portion 54 is shaped as a convex curve segment of a scroll or volute curve having an expansion index equivalent to the existing scroll expansion index or larger, for a radius that exceeds the existing fan radius by a specified amount, or delta R. The described convex curve approximates a free vortex motion of air above the surface. Therefore, the air flows along this side without impacting on it or separating from it and reduces the noise associated with the impact. The shape function of the convex-shaped portion 54 is adjusted by increasing or decreasing its expansion index which will always be equal to or greater than the expansion index of the existing scroll as well as by selecting the radius of curvature at a theoretical zero point to be equal to or greater than the existing fan radius. These two parameters are selected to provide a nose at the cut-off edge sufficient to manufacture the scroll. A preferred expansion index for the main scroll is eight and the convex-shaped portion 54 is preferred where delta R equals two with an expansion index of 11–12.

The first side 46 also includes a generally concave-shaped expanded or bulged section 56 extending a predetermined distance from the convex-shaped portion 54 of that side. FIG. 2 shows a top plan view of the diffuser and if line D—D is denoted as a transverse diameter of the diffuser, then the diameter of the diffuser 40 at section A—A is greatest at this bulged section 56. As the air flows from the bulged section 56 to the casing 42, the transverse diameter of the diffuser decreases.

Opposite the first side wall 46 of the diffuser 40 is the second side wall 48. The second side wall 48 includes a generally concave-shaped portion 60 disposed approximately opposite the convex-shaped portion 54 of the first side wall 46 as well as a generally convex-shaped portion 62 spaced a predetermined distance from the concave-shaped portion 60. The convex-shaped portion 62 of the second side wall 48 is disposed across from the bulged section 56 of the first side wall 46. The concave-shaped portion 60 of the second side 48 wall begins at a point defined by the angle θ. θ is defined as that angle from the cut-off portion of the blower housing in a direction opposite the air flow. The angle θ should be less than or equal to 30° such that the air exiting the blower housing does not impact the second side wall 48 as sharply as with a straight diffuser section. By minimizing the impact of the air flow against the second side wall, the tonal sound produced by such an impact, also known as the "blade passing frequency" tonal sound can be significantly reduced.

In addition to the bulged section 56 of the diffuser, the height of the diffuser as defined by the distance between a top wall 50 and bottom wall 52 is also non-uniform. The height of the diffuser 40 from section A—A to the heat exchanger case 42 increases linearly as best seen in FIG. 3. This expansion of the volume of the diffuser from the bulged section to the height of the heat exchanger casing allows for a greater expansion of the air, thus reducing the air flow separation in the diffuser.

Figure 5:
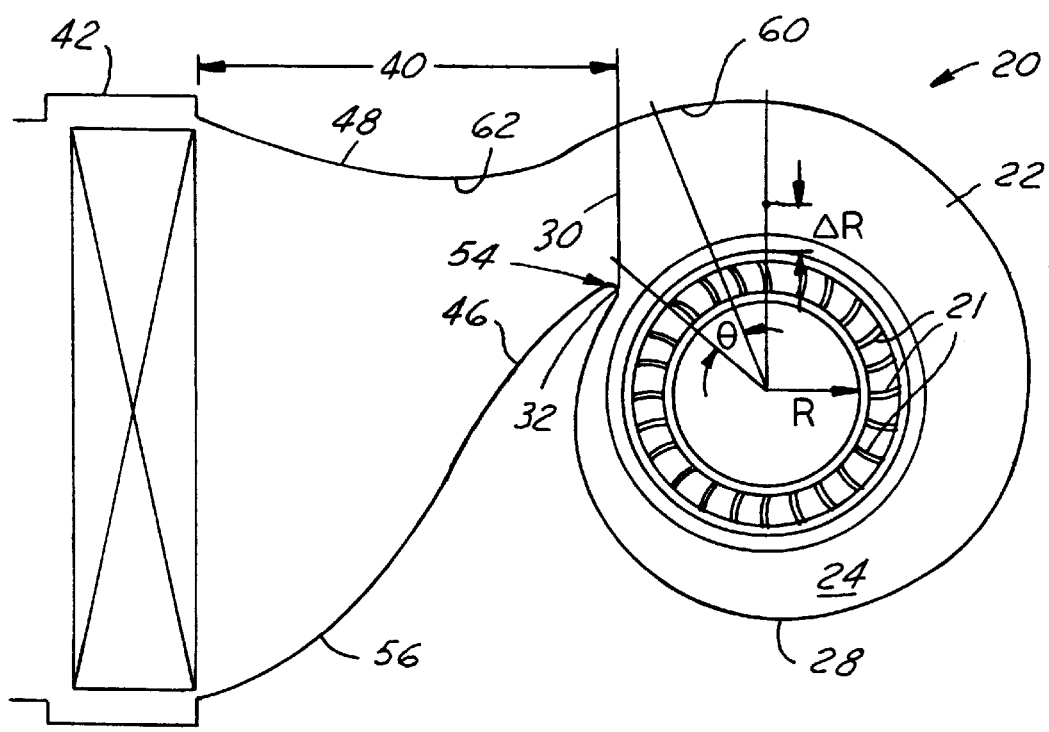
FIG. 5 is a top plan view of an alternative embodiment of a centrifugal blower assembly structured in accord with the principles of the present invention.

FIG. 5 shows a second embodiment of the invention. In this embodiment, like reference numerals have been used to designate similar structure to that described in FIGS. 2 and 3. As above, the diffuser 40 extends between the exit end 30 of the blower housing 22 and the heat exchanger casing 42. The diffuser includes a top wall 50 and a bottom wall 52. The first side 46 of the diffuser includes a generally convex-shaped portion 54 which is immediately adjacent the cut-off edge 32 of the blower housing 22. The shape of the convex-shaped portion 54 of the first side 46 is predetermined as a function of the expansion index of the scroll housing. The convex-shaped portion 54 is shaped as described above, like a convex curve segment of a scroll or volute curve having an expansion index equivalent to the existing scroll expansion index or larger, for a radius that exceeds the existing fan radius by a specified amount, or delta R. The first side 46 also includes a generally concave-shaped portion 56' extending a predetermined distance from the convex-shaped portion 54 of that side to the casing 42. The difference between this embodiment is that the concave-shaped portion 54' continues to expand until the casing 42, whereas the bulged section 54 is localized.

Similarly, opposite the first side wall 46 of the diffuser 40 is the second side wall 48. The second side wall 48 includes a generally concave-shaped portion 60 disposed approximately opposite the convex-shaped portion 54 of the first side wall 46 as well as a generally convex-shaped portion 62 spaced a predetermined distance from the concave-shaped portion 60. The convex-shaped portion 62 of the second side wall 48 is disposed across from the concave-shaped portion 56 of the first side wall 46. The concave-shaped portion 60 of the second side 48 wall begins at a point defined by the angle θ as described above.

The advantage of the FIG. 5 embodiment is that the pressure gradient of air flowing into a heat exchanger in casing 42 can be uniform across the entire heat exchanger. This is accomplished by adjusting the curvature of the first and second side walls 46, 48 according to a specified expansion index as explained above. This embodiment has particular utility in heat exchange systems which are not stacked as described with reference to FIGS. 2 and 3.

The described curvatures of the first and second side walls of the diffuser as well as the top and bottom walls eliminate or minimize the air separation from the first side wall surface. The change in direction of the curvature from convex to concave of the first side 46 and from concave to convex on the second side 48 reverses the pressure gradient in the diffuser passage. This aids the pressure at the first side to eliminate the separation at this side and reduces the vibration of the second side due to air impact. Therefore, reductions in energy losses, improvements in sound quality, noise reductions associated with air impact, fluctuations and or separation from the scroll exit surfaces are achieved with the present invention. The diffuser and the exit end of the scroll housing described in the present invention eliminates or minimizes the reversed flow of the air back into the scroll at high resistant modes of the HVAC system, particularly when compared to wide, straight diffuser designs of the same area at the end of the diffuser.

Many variations will no doubt occur to those skilled in the art. For example, the blower housing, diffuser and heat exchanger casings can all be fabricated integrally from a synthetic polymeric material. It is the following claims, including all equivalents which define the scope of my invention.

What is claimed is:

1. A heat exchange system for an automotive vehicle, comprising:

a heat exchanger disposed in a casing;

a centrifugal blower disposed upstream from said heat exchanger for producing a flow of directed air to said heat exchanger, said centrifugal blower being disposed in a generally scroll-shaped housing including an air inlet side, a bottom side opposite said air inlet side and a generally cylindrical, curved wall extending between the air inlet side and the bottom side and thereby defining a volute chamber through which a volume of air passes, said chamber terminating in an exit end defining a blower cut-off edge; and a diffuser extending between said exit end of blower housing and said casing, said diffuser including a top wall, a bottom wall, a first side having a generally convex-shaped portion immediately adjacent said blower cut-off edge and a generally concave-shaped portion a predetermined distance therefrom, and a second side having a generally concave-shaped portion disposed across from said cut-off edge and a generally convex-shaped portion a predetermined distance therefrom;

said first side of said diffuser including an expanded section disposed opposite said convex-shaped portion of said second side of said diffuser; and wherein said diffuser includes a transverse diameter coplanar with said inlet side of said blower casing, the transverse diameter of said diffuser being greatest at said expanded section and decreasing from said expanded section to said casing, whereby the centrifugal blower produces a stream of non-uniform air flow through the blower housing toward the casing and said diffuser minimizes separation of the air flow to said casing and substantially eliminates the impact of the air flowing in a non-linear motion to reduce noise.

2. A heat exchange system according to claim 1, wherein said top wall and bottom wall of said diffuser define a chamber therebetween, said chamber including a height generally perpendicular to said transverse diameter and defining a volume therein.

3. A heat exchange system according to claim 2, wherein said volume of said chamber increases from said expanded section to said casing.

4. A heat exchange system according to claim 2, wherein the distance between said top wall and said bottom wall of said diffuser increases linearly from said expanded section to said casing.

5. A heat exchange system according to claim 1, wherein the concave-shaped portion of the second side of said diffuser is disposed at an angle less than or equal to 30° from the cut-off edge of said housing.

6. A heat exchange system according to claim 1, wherein said blower housing, said diffuser and said casing are formed integrally from a synthetic polymeric material.

7. A heat exchange system for an automotive vehicle, comprising:

a heat exchanger disposed in a casing;

a centrifugal blower disposed upstream from said heat exchanger for producing a flow of air directed to said heat exchanger, said centrifugal blower being disposed in a generally scroll-shaped housing including an air inlet side, a bottom side opposite said air inlet side and a generally cylindrical, curved wall extending between the air inlet side and the bottom side and thereby defining a volute chamber through which a volume of air passes, said chamber terminating in an exit end defining a cut-off edge; and a diffuser extending between said exit end of blower housing and said casing, said diffuser including a top wall, a bottom wall, a first side and a second side, said diffuser defining a chamber therebetween, said chamber including a height generally perpendicular to a transverse diameter thereof and defining a volume therein, and wherein;

said first side includes a generally convex-shaped portion proximate said blower cut-off edge and a generally concave-shaped bulged section disposed a predetermined distance therefrom, the height between said top wall and said bottom wall of said diffuser increasing linearly from said bulged section to said casing; and said second side includes a generally concave-shaped portion proximate said cut-off edge and a generally convex-shaped portion a predetermined distance therefrom;

whereby the centrifugal blower produces a stream of non-uniform air flow through the blower housing toward the casing and said diffuser minimizes separation of the air flow to said casing and substantially eliminates the impact of the air flowing in a non-linear motion to reduce noise.

8. A heat exchange system according to claim 7, wherein the concave-shaped portion of the second side of said diffuser is disposed at an angle less than or equal to 30° from the cut-off edge of said housing.

9. A heat exchange system according to claim 7, wherein said blower housing, said diffuser and said casing are formed integrally from a synthetic polymeric material.

10. A centrifugal blower assembly for an automotive vehicle for producing a flow of air directed to a heat exchanger core, comprising:

a fan wheel having a plurality of fan blades disposed between a fan ring and a fan hub;

a motor having a rotating shaft projecting therefrom and into engagement with said fan hub, said motor being operative to rotate said fan wheel about an axis coincident with the axis of said rotating shaft;

a housing including an air inlet side, a bottom side opposite said air inlet side and a generally cylindrical, curved wall extending between the air inlet side and the bottom side and thereby defining a volute chamber through which a volume of air passes, said chamber terminating in an exit end defining a cut-off edge section; and a diffuser extending from said exit end of blower housing to said heat exchanger, said diffuser including a top wall, a bottom wall, a first side and a second side, said diffuser defining a chamber therebetween, said chamber including a height generally perpendicular to said transverse diameter and defining a volume therein, and wherein;

said first side includes a generally convex-shaped portion proximate said blower cut-off and a generally concave-shaped bulged section disposed a predetermined distance therefrom, the height between said top wall and said bottom wall of said diffuser increasing linearly from said bulged section to said casing; and said second side includes a generally concave-shaped portion proximate said cut-off edge side wall and a generally convex-shaped portion a predetermined distance therefrom;

whereby the centrifugal blower produces a stream of non-uniform air flow through the blower housing toward the heat exchanger and said diffuser minimizes separation of the air flow to said casing and substantially eliminates the impact of the air flowing in a non-linear motion to reduce noise.

* * * * *